(12) United States Patent
Kothari et al.

(10) Patent No.: US 12,400,365 B2
(45) Date of Patent: Aug. 26, 2025

(54) SYSTEMS AND METHODS FOR AUTONOMOUS VEHICLE SENSOR CALIBRATION AND VALIDATION

(71) Applicant: Volkswagen Group of America Investments, LLC, Reston, VA (US)

(72) Inventors: Parul Kothari, New York, NY (US); Hatem Alismail, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 493 days.

(21) Appl. No.: 17/806,838

(22) Filed: Jun. 14, 2022

(65) Prior Publication Data
US 2023/0401745 A1    Dec. 14, 2023

(51) Int. Cl.
| | |
|---|---|
| *G06T 7/80* | (2017.01) |
| *B60W 60/00* | (2020.01) |
| *G06T 7/70* | (2017.01) |
| *B60W 50/00* | (2006.01) |

(52) U.S. Cl.
CPC .............. *G06T 7/80* (2017.01); *B60W 60/00* (2020.02); *G06T 7/70* (2017.01); *B60W 2050/0083* (2013.01); *B60W 2420/403* (2013.01); *G06T 2207/30252* (2013.01)

(58) Field of Classification Search
CPC ... G06T 7/80; G06T 7/70; G06T 2207/30252; G06T 2207/10016; G06T 2207/30208; B60W 60/00; B60W 2050/0083; B60W 2420/403

See application file for complete search history.

(56) References Cited

U.S. PATENT DOCUMENTS

| | | | |
|---|---|---|---|
| 8,248,471 B2 * | 8/2012 | Inui | G06T 7/80 |
| | | | 701/1 |
| 9,201,424 B1 * | 12/2015 | Ogale | G05D 1/0253 |
| 9,315,192 B1 * | 4/2016 | Zhu | B60W 30/09 |
| 9,641,830 B2 | 5/2017 | Mallet et al. | |
| 9,774,837 B2 * | 9/2017 | Chang | H04N 9/3185 |
| 9,933,515 B2 | 4/2018 | Prokhorov | |
| 10,269,141 B1 * | 4/2019 | Shotan | G01S 17/86 |

(Continued)

FOREIGN PATENT DOCUMENTS

CN    104732542    * 7/2018 ............... G06T 7/80

OTHER PUBLICATIONS

Harguess, J. et al., Infrared Stereo Calibration for Unmanned Ground Vehicle Navigation, SPIE Proc. 9084: Unmanned Systems Technology XVI, Baltimore, MD, May 6-8, 2014.

(Continued)

*Primary Examiner* — Tom Y Lu
(74) *Attorney, Agent, or Firm* — Fox Rothschild LLP (57) ABSTRACT

Methods and systems for determining whether a camera of an autonomous vehicle (AV) is calibrated are disclosed. The method includes determining a relative positional range for a calibration target with respect to the AV, capturing a plurality of images of the calibration target, using the camera when the calibration target and the AV are positioned within the relative positional range, measuring a camera-based calibration factor and a motion-based validation factor based on the plurality of images for generating a confidence score, and generating a signal indicating that the camera is not calibrated when the confidence score is below a threshold.

20 Claims, 6 Drawing Sheets

(56) References Cited

U.S. PATENT DOCUMENTS

| | | | |
|---|---|---|---|
| 10,726,579 | B1 | 7/2020 | Huang |
| 10,832,502 | B2 | 11/2020 | Levinson et al. |
| 10,859,684 | B1 | 12/2020 | Nabatchian |
| 10,935,643 | B2 | 3/2021 | Lin |
| 11,327,162 | B1 | 5/2022 | Grabe et al. |
| 2017/0010618 | A1* | 1/2017 | Shashua ............... B62D 15/025 |
| 2018/0232907 | A1* | 8/2018 | Sung .................... H04N 17/002 |
| 2019/0104295 | A1* | 4/2019 | Wendel ............... G01B 11/2504 |
| 2019/0204425 | A1 | 7/2019 | Abari et al. |
| 2019/0265722 | A1 | 8/2019 | Haeusler et al. |
| 2019/0287267 | A1* | 9/2019 | Chen ........................ G06T 5/80 |
| 2020/0211224 | A1 | 7/2020 | Kawabe et al. |
| 2021/0004610 | A1 | 1/2021 | Huang et al. |

OTHER PUBLICATIONS

Geiger, A. et al., Automatic Camera and Range Sensor Calibration using a single Shot, www.cvlibs.net.
International Search Report and Written Opinion for PCT/US2023/068166 dated Sep. 28, 2023, 11 pages.

* cited by examiner

SYSTEMS AND METHODS FOR AUTONOMOUS VEHICLE SENSOR CALIBRATION AND VALIDATION

BACKGROUND

The present disclosure relates to autonomous vehicle sensor calibration validation and, in particular, to validating sensor calibration in autonomous vehicles in real-time using a calibration target.

Autonomous driving requires perception and prediction of the surrounding environment, including other actors on the road. This aids in decreasing the potential for conflict between an autonomous vehicle (AV) and other actors and objects along a trajectory of the AV. AVs utilize a variety of sensors for such perception and prediction of the surrounding environment. Many of these sensors may require occasional calibration for efficient navigation.

Typically, a calibration system that calibrates sensors such as a camera or a LIDAR mounted to a vehicle includes a calibration target (e.g., an object with a predefined geometry) installed around a turntable that rotates the vehicle, and is detected by the sensors. Because the geometry of the calibration target is known in advance, a sensor system can be calibrated by compensating for variations between the calibration target as observed and the known actual dimensions of the calibration target. One way of ensuring a consistent geometry on the object is to use a panel patterned with a predefined pattern having known dimensions. Checkerboard patterns are commonly used for this purpose. Such calibration systems require an extensive facility including the turntable and the calibration marker (and associated installation), which increases the cost of preparing an environment for calibration. Moreover, one must ensure that the calibration object must be placed in the predefined position accurately and with substantial precision. This can require expertise and experience in robotics and mathematics. Over time, factory calibrated sensors can move out of alignment and may need to be recalibrated, requiring the autonomous vehicle to be taken to the calibration facility because if left uncalibrated, the reliability of the information obtained from the sensors can be affected. Taking the vehicle into a service center for recalibration of the sensors is inefficient and inconvenient for an owner of the vehicle.

This document describes methods and systems that are directed to addressing the problems described above, and/or other issues.

SUMMARY

This document describes methods, systems, and computer program products for determining whether a camera of an autonomous vehicle (AV) is calibrated. The methods may include determining, for a calibration target, a relative positional range with respect to the AV where the relative positional range can include a plurality of locations and a plurality of orientations of the calibration target relative to the AV. The methods may further include capturing a plurality of images (e.g., using the camera) of the calibration target when the calibration target and the AV are positioned within the relative positional range, measuring a camera-based calibration factor and a motion-based validation factor based on the plurality of images, using the camera-based calibration factor and the motion-based validation factor to generate a confidence score, and generating a signal indicating that the camera is not calibrated in response to the confidence score being below a threshold.

Optionally, determining the plurality of locations in the relative positional range may include determining the plurality of locations such that the calibration target remains within a field of view of at least two cameras of the vehicle. Additionally and/or alternatively, determining the plurality of locations in the relative positional range may include determining the plurality of locations such that the calibration target remains within about 80% to about 120% of a focal length of the camera. In various implementations, the plurality of orientations in the relative positional range may be determined based on a resolution of the camera and a size of one or more fiducials included in the calibration target.

In one or more implementations, the methods may include performing an action assessment of the AV in response to the confidence score being below the threshold. Optionally, the methods may include causing the AV to perform an action based on the action assessment. Examples of the action can include, without limitation, recalibrating the camera, altering a trajectory of the AV, and/or altering a velocity of the AV.

In various implementations, measuring the camera-based calibration factor can include measuring the camera-based calibration factor based on, for example, a re-projection error, a change in one or more intrinsic parameters of the camera with respect to a previously performed calibration, a change in one or more intrinsic parameters of the camera with respect to the previously performed calibration, an optimization uncertainty check of the one or more intrinsic parameters of the camera with respect to corresponding estimated values, and/or an optimization uncertainty check of the one or more extrinsic parameters of the camera with respect to corresponding estimated values.

In various implementations, measuring the motion-based validation factor may include estimating a first velocity of the camera based on the plurality of images, estimating a second velocity of the camera using one or more inertial sensors of the AV, and comparing the first velocity and the second velocity.

Optionally, the methods may also include configuring a plurality of fiducials included in the calibration target based on one or more intrinsic parameters of the camera.

Implementing systems of the above-described methods for calibration and can include, but are not limited to, a processor and a non-transitory computer-readable storage medium comprising programming instructions that are configured to cause the processor to implement a method for calibrating sensors. Optionally, the programming instructions may be included in a computer program product.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

The term "module" refers to hardware, programming instructions embodied in software or firmware, or a combination of hardware and programming instructions that work together to perform a described function. Various hardware elements such as processors may be shared among multiple modules. Similarly, various programming instruction portions, such as subroutines or libraries, may be shared among multiple modules.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones, and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking, and other advanced driver assistance systems.

In this document, when terms such as "first" and "second" are used to modify a noun, such use is simply intended to distinguish one item from another, and such terms are not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

An AV may include one or more sensors of various and complementary types to capture information of the external environment of AV. Successful navigation of an AV depends on having accurate data measurement and representation of the external environment at all times. Having accurate data or three-dimensional model of the external environment is, in turn, dependent at least in part on proper calibration of the AV's sensors, which may include knowing the initial configurations and/or conditions of the sensors and how objects or obstacles are detected by the sensors. In order to properly process data obtained by the sensors, a system may need to know the relationship between the sensor data and the position, orientation, and/or configuration of the sensors, since any misalignment, rotation, or translation of the sensors, if not properly accounted for, may prevent the generation of an accurate model that accurately represents the external environment of the AV or the ability of the AV to accurately perceive the external environment. As an example, the sensors of AV may shift from their proper positions due to vibration, wind, rain, collisions with other vehicles or objects, or driving over objects or potholes on the road. Given the importance of having properly calibrated AV sensors and the likely high frequency of calibration being needed (e.g., since AV sensors are exposed to the elements and moving at high speed with the AV), the time, resources, and opportunity cost of AV calibration may be significantly high.

The disclosure describes calibration targets, and systems and methods for using the calibration targets for calibrating and/or verifying and/or validating the calibration of the sensors of an AV, without the use of specialized facilities (e.g., those including vehicle turntables) and/or manual expertise. This is particularly useful when the sensors of the AV may need to be recalibrated and/or the calibration may need to be validated while the AV is in the field. For example, in the case of an accident, one or more sensors of the AV may become misaligned thereby making continued autonomous navigation problematic. Instead of immediately shutting down or recalling the AV, it may be preferable to first validate the calibration, such that the vehicle is only taken to a calibration facility if the calibration cannot be validated. Optionally, the system may also recalibrate the sensors in the field and have the AV continue operating since the AV may be brought back online more quickly without spending the time to go back to the service facility. Once the recalibration is performed, the AV may resume normal operations (assuming the AV can be driven and/or has minimal damage due to the accident). Embodiments illustrated and described herein may result in higher utilization of AVs with reduced downtime since AVs may not need to be recalled or towed to a service facility when sensors require recalibration during operation. Optionally, an AV may only be brought to a service facility when it actually fails a calibration validation. In addition, the embodiments illustrated and described herein may result in timely resolution of situations by identifying calibration issues and/or allowing an AV to resume navigation after detecting problems with the sensors of the sensor array.

Figure 1:
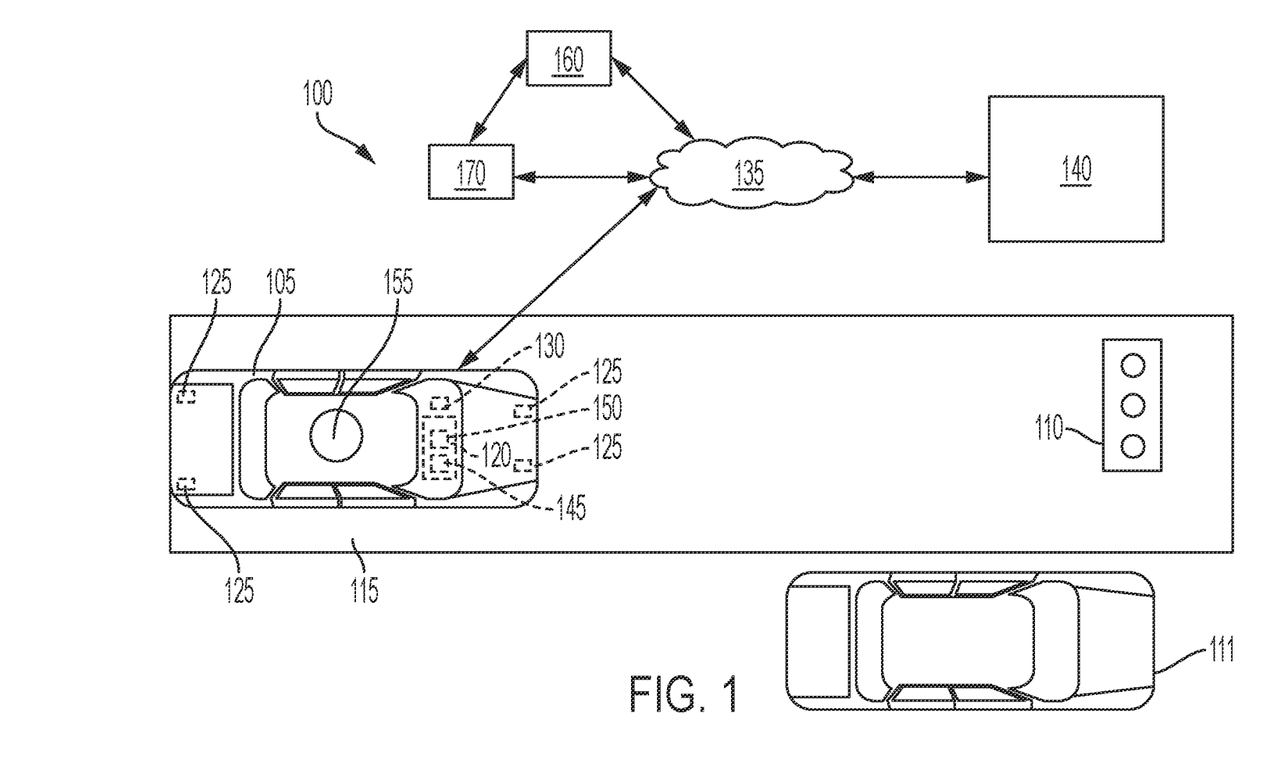
FIG. 1 is an example of a system for validating camera calibration on an autonomous vehicle, according to various embodiments of the present disclosure.

Referring now to FIG. 1, a system 100 for camera calibration and/or validating camera calibration is illustratively depicted, in accordance with various embodiments of the present disclosure.

According to various embodiments, the system 100 includes a vehicle 105 (e.g., an AV or another type of vehicle). The vehicle 105 may be traveling on a road 115. It is noted, however, that any suitable path for the vehicle 105 may be implemented. The environment around a vehicle 105 will include various objects such as traffic lights 110, other vehicles 111, pedestrians, or other objects. These objects 110 may be stationary or in motion and may be, or may become, in the path of one or more trajectories of the vehicle 105. In order to accurately detect and photographically capture these one or more objects 110, a calibration module 160 may perform calibration and/or calibration validation of one or more cameras 125 coupled to the vehicle 105. The calibration module 160 may be included in the vehicle 105 and/or may be remotely located and in communication with the vehicle 105.

The vehicle 105 may include one or more computing devices 120 configured to receive sensor data pertaining to each of the objects 110. The sensor data is generated by one or more cameras 125 that are coupled to the vehicle 105. The vehicle 105 may include additional sensors such as one or more radio detection and ranging (RADAR) systems, one or more light detection and ranging (LIDAR) systems 155, and/or one or more other suitable sensor types. The computing device 120 may be in electronic communication with the one or more sensors such as cameras 125 and LIDAR system 155. The one or more cameras 125 may be positioned at various positions of the vehicle 105 such as, for example, the front, rear, and/or sides of the AV 105 and/or any other suitable position or positions. The cameras 125 may include one or more pairs of stereo cameras. According to various embodiments, the vehicle 105 may include a plurality of cameras 125 encircling the vehicle 105.

The vehicle 105 may include a geographic location system configured to determine a location and orientation of the vehicle 105 and/or one or more of the objects 110, 111. The geographic location system may include a Global Positioning System device. It is noted, however, that other forms of geographic location may additionally, or alternatively, be used, such as high-definition maps and programming that is configured to correlate information from images captured by the cameras 125 to data in the maps.

The vehicle 105 may further include a transceiver 130 configured to send and/or receive digital information from a remote server 140 via a wired and/or wireless connection such as, for example, through a wireless communication network 135, wherein the vehicle 105 and the remote server 140 are in electronic communication with each other. The computing device 120 may include a processor 145. The processor 145 may be configured to receive, using the transceiver 130, information pertaining to features of the environment at the location of the vehicle 105, and use the information and the orientation of the vehicle 105 to identify one or more of the objects 110, 111. It is noted that the processor 145 may be a standalone processor 145, the vehicle's 105 processor 145, and/or the remote server's 140 processor 145. Data processed by the processor 145 may be data received from the vehicle 105, received from the remote server 140, and/or a combination of data received from the vehicle 105 and the remote server 140. According to various embodiments, the computing device 120 may include one or more digital storage devices 150, and/or some or all of the digital information may be stored locally at the vehicle 105.

Each of the sensors is configured to generate data pertaining to objects 110, 111 that are within a range of detection of the sensors. By executing programming instructions that the processor 145 is configured to analyze the sensor data in order to detect the objects 110, 111. For example, as shown in FIG. 1, one or more objects 110, 111 are in the environment of the vehicle 105 and visible from the vehicle 105. Depending on the position/pose of the vehicle 105, these objects 110, 111 may be within the field of view of one or more cameras 125 coupled to the vehicle 105. However, if the calibration of one or more of the cameras 125 is invalid, the vehicle 105 may incorrectly determine a position of one or more of the objects 110, 111 in relation to the vehicle 105.

The calibration module 160 is configured to combine information from vehicle pose and object detection relating to a calibration target 170 placed in the vicinity of the vehicle 105 to either calibrate a camera or validate whether camera calibration is correct. By using this information jointly, camera calibration can be validated accurately, in real-time. Processes by which the calibration module may do this will be described below. Optionally, information about the calibration target 170 (e.g., tag information) may be stored in a data store (not shown here) and made available to the calibration module 160. In some embodiments, after the vehicle 105 has been initially calibrated at a facility, the data store may store calibrated sensor models (e.g., a camera model, a LIDAR model) and/or calibration references of how properly calibrated sensors for the vehicle 105 should behave and/or perceive information. Periodic in-field measurements of sensors may be compared to the calibration reference to determine whether recalibration of sensor(s) is necessary (discussed below).

The typical process for calibrating cameras involves imaging a calibration target from multiple viewpoints, and then identifying calibration points in the image that correspond to known points on the calibration target. One of the most frequently used calibration targets is a black and white planar checkerboard, where the calibration points are the corner points between squares. The problem in using checkerboards for camera calibration applications lies in how each corner point is detected and identified because it requires visibility of the complete image. As such the calibration target may need to be imaged several times in case of, for example, partial visibility due to clipping against the image boundary, occlusion, uneven illumination, distortion, or the like. The calibration target of the current disclosure includes individually identifiable fiducials positioned between tags that allow for calibration even when the image is not completely visible, while providing a customizable fiducial density.

Figure 2:
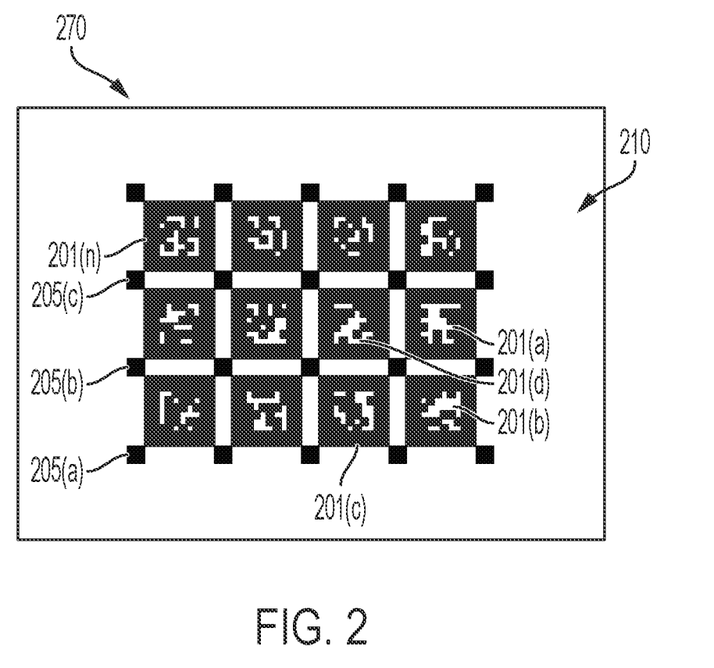
FIG. 2 is an example illustration of a calibration target.

Referring now to FIG. 2A, an example calibration target 270 (e.g., the calibration target 170 of FIG. 1) is illustrated. As shown in FIG. 2A, the calibration target 170 includes a substantially planar panel 210 with a plurality of fiducials 201(a)-(n) arranged thereon in a calibration pattern. Fiducials are optically recognizable features that can provide reference points for cameras. Such fiducials can include, for example, randomly generated visual patterns of black and white (or any other contrasting color) blocks of a fixed size. The pattern can include any shape, image, icon, letter, symbol, number, or pattern. For example, a checkerboard fiducial has a quadrilateral boundary within which varying patterns of black and white blocks are arranged. Example checkerboard fiducials can include AprilTags (e.g., those shown in FIG. 2), QR codes, ARTag markers, ArUco markers, or the like. AprilTags are conceptually similar to QR codes in that they are a type of two-dimensional bar code. AprilTags, however, are designed to encode smaller data payloads, allowing them to be detected more robustly and from longer ranges. Further description for AprilTags can be found in an article by Edwin Olson entitled "AprilTag: A robust and flexible visual fiducial system" *In Proceedings of the IEEE International Conference on Robotics and Automation (ICRA)*, May 2011. Optionally, one or more of the fiducials of a calibration target panel may have different shapes (e.g., a triangular shape, a rectangular shape, a circular shape, a square shape etc.) and/or internal patterns. Multiple different subsets of fiducials on the same panel may have different shapes, arrangements, patterns, etc. to identify different portions of the respective panel, arrangement, or pattern. Additionally, or alternatively, fiducials in some embodiments may have special optical properties (e.g., a fiducial marker may be holographic).

The fiducials may be arranged in a uniform and/or non-uniform pattern (e.g., as a grid, a checkerboard, etc.) on the panel 210. The location of the fiducials on the calibration target may be determined using tags (described below), and any deviation from those locations in the resulting captured or recorded calibration images can be identified. These identified deviations may then be corrected or accounted for when using the camera (i.e., the camera may be "calibrated", or calibration may be "validated").

Such fiducials and their positional pattern on the panel, as well as the panel size, may be designed based on an anticipated location of the camera during calibration, the focal length of the camera, the zoom of the camera during calibration, and/or the resolution of the camera. The smaller the fiducials are with respect to the panel; the more fiducials can fit on the panel. Increasing the number of fiducials that can fit on the panel can increase the number of calibration points (e.g., positions in three-dimensional space whose corresponding two-dimensional location is used to calibrate an image), and ultimately increase the accuracy of a calibration. Specifically, an increased number of fiducials may increase the resolution with which the calibration of a camera can be performed. Alternatively, a reduced number of fiducials may increase the speed at which the calibration of a camera can be performed. Moreover, the fiducials need to be of at least a minimum resolvable size based on the camera given its zoom, resolution, focal length, distance from the calibration target, etc. Thus, the fiducials on the panel may be sized (and spaced relative to one another) such that they are of the smallest size still resolvable by the camera, such that the maximum number of fiducials can be positioned on the panel.

The fiducials may be printed on labels and affixed to the panel 210, painted directly on the panel 210, incorporated directly within the panel 210 (e.g., by etching, molding), or the like.

The panel 210 may also, optionally, include uniquely identifiable tags 205(*a*)-(*n*) that are positioned at one or more corners of some or all of the fiducials 201(*a*)-(*n*). where a tag may be used to identify a fiducial within a captured image. For example, as shown in FIG. 2A, the calibration target 270 is configured to be fully tagged such that each of the fiducials has a tag on each of its four corners. A tag may include information such as, without limitation, information relating to its location on the panel 210 and associated fiducial information such as an identification of the corresponding fiducial (e.g., name, ID, type, etc.), size of the fiducial, color of the fiducial, associated corner of the fiducial (e.g., top left, bottom right, etc.), or the like. The tag may be, for example, a QR code, a barcode, a Bluetooth beacon, a near-field communication (NFC) tag, an alphanumeric tag, a tag including LEDs, a data matrix, data glyphs, raised or lowered features similar to braille, or the like. Optionally, the uniquely identifiable tags may be positioned at a subset of the corners of some of the fiducials (e.g., 2, 3, etc.), without deviating from the principles of this disclosure such that the panel 210 is partially tagged.

Additionally and/or alternatively, a fiducial may have a unique pattern (e.g., black and white block patterns) and may itself act as a tag such that it may be identified based on the unique pattern. In a partially tagged panel 210, at least some of the fiducials may have a unique pattern while the other fiducials may share a pattern.

A vehicle camera may capture an image of at least a portion of the calibration target (or panel) during calibration and/or calibration validation (when that portion of the calibration target is present within the focal length and the field of view of the vehicle camera). The captured image may include tag information associated with each of the fiducials included within the captured image of the calibration target. As such, when a fiducial with at least a subset of its tags is imaged (and/or the image includes at least one fiducial having a unique pattern), the system may retrieve information from the imaged tag(s) and/or fiducials, and determine the identity of the corresponding fiducial, its size, and location on the panel. This may in turn be used to determine the position of the corners of the fiducial even when the panel and/or the fiducial is not completely imaged e.g., due to obstructions, distortions, etc.), thereby reducing the number of times the panel needs to be imaged during calibration, as well as the processing power (because the system does not need to compute the location of the corners of the fiducials).

In some embodiments, a tag may be a dynamic or changing tag where the tag may be modified as desired to transmit updated position or ancillary information and/or to not transmit any information at all. For example, the size of fiducials in a panel may be dynamically changed (i.e., increased or decreased) by turning ON or OFF the tags associated with some of the tags. For example, tags 205(*a*)-(*e*) may be turned off to change individual smaller size fiducials 201(*a*)-(*d*) into a single bigger size fiducial as a combination of fiducials 201(*a*)-(*d*). Similarly, if one or more fiducials (with unique or similar patterns) may be grouped, and may act as a single tag. Such dynamic modification of the fiducials and/or their calibration pattern may be performed in order to, for example, improve the accuracy of calibration (by increasing the number of smaller size fiducials), increase processing time (by increasing the number of bigger size fiducials), configure the fiducials such that are of least a minimum resolvable size-based zoom, resolution, focal length, distance from the calibration target, etc. of the camera to be calibrated and/or validated. For example, cameras differ in the focal lengths and fields of view, and bigger fiducials may be created for far view cameras (or vice versa). For example, the size of the fiducials may be dynamically configured such that each fiducial image will occupy at least 32×32 pixels squared at the focus distance of the camera, when the calibration target is imaged using the camera. In other words, the calibration target of the current disclosure can be dynamically configured or modified based on the calibration/validation requirements, the type of camera, and the environment within which the calibration/validation will be performed.

It should be noted that a variety of cameras may benefit from calibration using the calibration target of this disclosure. For example, the cameras calibrated may be components of autonomous vehicles used for navigation or object recognition. Further, the cameras calibrated may have a variety of different features (e.g., varying focal lengths, different lens types, different image sensors, etc.). The calibration target may be used to calibrate digital cameras (i.e., cameras that store images electrically or magnetically as a series of bits), such as digital cameras having charge-coupled devices (CCDs) or complementary metal-oxide-semiconductor (CMOS) image sensors, or to calibrate film cameras (i.e., cameras that store images chemically on a strip of photographic film).

It should also be noted that the calibration target described above may be used for calibration and/or calibration validation of other sensors such as, without limitation, RADAR, LIDAR, or the like. In such cases, the calibration pattern of the fiducials used may be different from the checkerboard pattern used for the cameras. For example, the pattern can be based on a textured surface rather than a flat image, using varying reflectivity features, etc. In addition, some sensors can be calibrated together or jointly, such as, for example, the RADAR sensor and the LIDAR sensor, while other sensors such as the cameras are calibrated separately. In another example, one or more calibration targets may have a calibration surface designed to calibrate both optical camera and LIDARs (e.g., a cube, hexagonal or tetrahedral volume, any of which may have regions of varying reflective properties (for LIDAR calibration) and visible patterns (for optical-camera calibration) on each side of the 3D volume.).

In various embodiments, the calibration target 170 may be fixed (e.g., panel 210 affixed to a stationary pole) or mobile (e.g., panel 210 affixed to a mobile platform). In one scenario, the calibration target 270 may be present on another autonomously controlled vehicle or robot. It should be noted that any number of calibration targets may be used.

Before describing particular embodiments for facilitating or validating calibration, it should be noted that calibration is performed on the sensors to refine initial knowledge of the locations and orientations of the sensors, so that the data from the sensors are all measured with reference to the expected coordinate system. Each type of sensor may have a calibration algorithm that is unique to the particular type of sensor. In particular embodiments, a calibration target (described above) may be configured to calibrate multiple types of sensors of a vehicle. As an example, and not by way of limitation, a calibration issue may be detected if the orientation of a calibration surface as measured by the optical camera is different from the orientation measured by the LIDAR. As another example, a calibration issue may be detected if the distance to a calibration surface as measured by LIDAR is different from the distance measured by an ultrasound sensor.

With respect to optical cameras, it should be noted that such cameras have internal characteristics, such as focal length, skew, distortion, and image center, as well as external characteristics, such as position and orientation relative to a captured scene. As such, for optical cameras, calibration may involve intrinsic and extrinsic calibration. Intrinsic calibration involves the calibration of the internal components of an optical camera including the lens to correct lens distortion of the incoming light to the principal point or optical center of the image sensor. Intrinsic parameters are necessary to link pixel coordinates of an image point with corresponding coordinates in a camera reference frame. Intrinsic parameters, depending on camera characteristics, may involve estimation of focal length, skew parameter, and image center. In contrast, extrinsic parameters define the location and orientation of a camera reference frame with respect to a known world reference frame. Extrinsic parameters, depending on the position of a camera, may involve estimation of rigid body transformation between the sensors. Extrinsic calibration involves the calibration of the position (e.g., translation) or rotation (e.g., orientation) of the optical camera.

Figure 3:
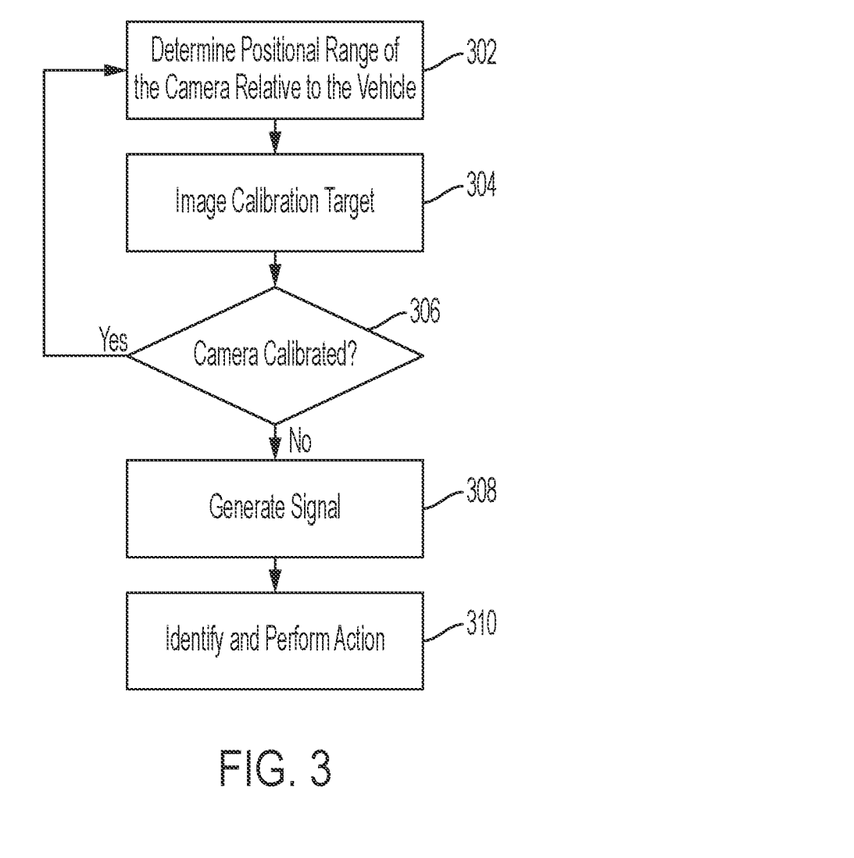
FIG. 3 illustrate various aspects of a method for validating camera calibration in autonomous vehicles, according to various embodiments of the present disclosure.

Referring now to FIG. 3, a method for calibrating and/or validating calibration of one or more cameras in a vehicle is illustratively depicted, in accordance with various embodiments of the present disclosure. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order.

Figure 4:
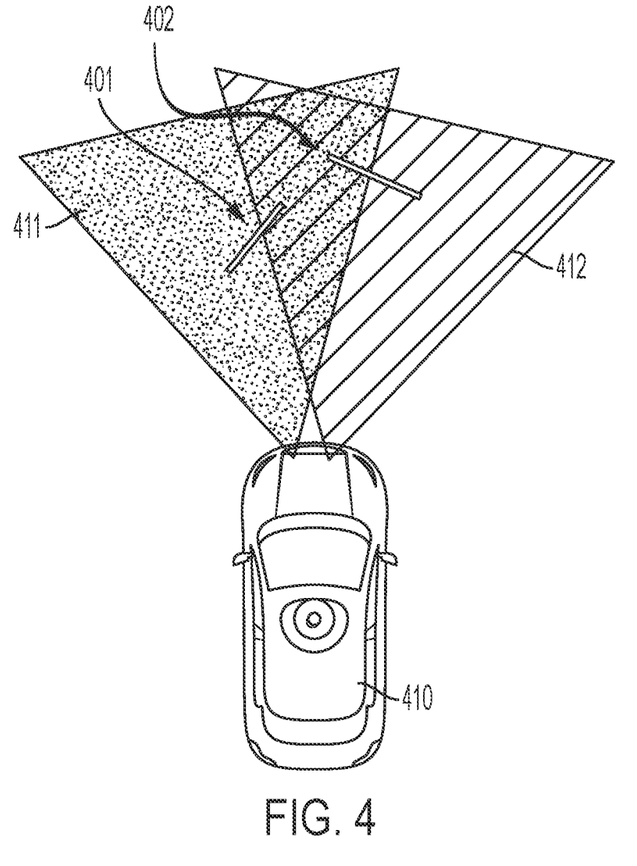
FIG. 4 illustrates the relative position of a calibration target with respect to a vehicle.

At 302, a positional range, an orientation range, and configuration of the calibration target with respect to the vehicle may be determined. For example, the calibration target position range may be determined such that the calibration target is within the overlapping fields of view (FOV) of at least two of the cameras of the vehicle and at a distance from each camera that is about 80-120% of the focal distance of the camera lens. For example, if a camera lens is focused at about 20 meters, the distance of the calibration target from the camera is about 16-24 meters. Optionally, the distance may be about 81-119% of the focal distance of the camera lens, about (79)-121% of the focal distance of the camera lens, about (82)-118% of the focal distance of the camera lens, about 85-115% of the focal distance of the camera lens, about 75-125% of the focal distance of the camera lens, within about 85-125% of the focal distance of the camera lens, within about 87-123% of the focal distance of the camera lens, within about 89-121% of the focal distance of the camera lens, or the like. For example, FIG. 4 shows two example positions 401 and 402 of the calibration target within overlapping FOVs 411 and 412 of two cameras of vehicle 410.

Focal length estimation of a camera is dependent upon observing foreshortening. Specifically, with camera calibration there is ambiguity between the calibration target's distance from the camera and the focal length which cannot be resolved by frontoparallel images of the calibration target. Images which capture fiducials with a wide range of camera frame z-values are needed in order to observe the focal length, and may be collected by tilting the calibration target at or below a maximum tilt angle (or orientation). The maximum tilt angle of the calibration target may be determined based on the camera resolution under perspective foreshortening given the fiducial size in the calibration target. Optionally, a direction of the tilt may be downward to avoid reflections caused by external lighting or the sun.

Movement of the calibration target to different locations and/or at different orientation within the determined ranges may facilitate the cameras to acquire image frames from a diverse range of viewpoints which constitutes diverse viewing angles, scales/zoom values, orientations, and the like.

A configuration of the calibration target (i.e., the number, size, and pattern of fiducials on the calibration target panel may be determined based on, for example, the focal length, resolution, and/or zoom of the camera (as discussed above).

The calibration target may be configured to have the determined configuration. As discussed above, the tags of the calibration target may be selectively turned ON to obtain the determined configuration of the calibration target.

At 304, the calibration target is imaged using vehicle cameras to capture a plurality of images of the calibration target from a diverse range of viewpoints which constitutes diverse viewing angles, scales/zoom values, orientations, and the like. This may be done by collecting the plurality of images during a period of relative motion between the vehicle (i.e., the camera(s)) and the calibration target. In various embodiments, during image capture, either the calibration target is moving while the vehicle is stationary, or the vehicle is moving while the calibration target is stationary to achieve the desired positions and orientations. This may be done by positioning the cameras, relative to the calibration target, at multiple positions and orientations within the determined position and orientation ranges, while ensuring that the calibration target is within the FOV of at least two of the vehicle camera for each image set collection. For example, an operator may move the calibration target to the one or more positions and/or orientation. Optionally, an autonomous robot may cause movement and/or tilting of the calibration target to the determined positions and/or orientations.

At 306, the captured images may be analyzed to determine whether or not the camera(s) of the vehicle are calibrated (i.e., perform calibration validation). As such, in various embodiments, the validation step may include a two-fold validation including a combination of camera-based calibration factor and a motion-based validation factor. For example, camera-based calibration can be used to validate calibration while the vehicle is stationary, while the motion-based validation can be used to account for dynamic movement of the sensors (i.e., dynamic changes in calibration of sensors individually and/or with respect to other sensors) while the vehicle is moving. Optionally, one of the camera-based calibration or the motion-based validation may be performed.

Camera-based calibration: The purpose of camera-based calibration is to correlate the pixel coordinates on the camera image plane with the physical coordinates of a calibration target. To establish the correspondence between the pixel coordinates of the image of an object and the physical coordinates of the object, point locations must be identified in the image and on the object, and the mapping between the corresponding point locations also be identified. In short, the key to the problem is to identify which point in the image corresponds to which point on the object. Corners of the fiducials on the calibration target image may be used for precisely identifying the feature point location. Any now or hereafter known methods may be used to determine the corners from the image pixel data of the calibration target images captured at various positions and orientations. For example, given the extracted corners of at-least one-fiducial on the calibration target, an initial estimate of the calibration target pose relative to the camera may be determined using a Perspective-N-Point (PnP) algorithm starting for a known initial estimate of the camera intrinsics (focal length, distortion parameters, the principal point, etc). The corner finding procedure may be performed on one or more of the captured calibration images. After obtaining the initial pose, all constraints may be included in a non-linear optimization problem (with robust M-estimator cost) to minimize the re-projection error between the position of the detected corners and their predictions by the optimizer. Some such processes are described in "Terzakis et al., A consistently fast and globally optimal solution to the perspective-n-point problem" (published in *European Conference on Computer Vision*, April 2020). It should be noted that camera-based calibration may be performed for both calibration as well as validation of calibration.

Additionally and/or alternatively, the system may analyze each captured image to retrieve tag data from tags included in the image such as, without limitation, fiducial size, type, and location with respect to the panel of each of the fiducials included in the captured image. As discussed above, the pattern included in the fidcucial may also be a tag. When using the information received from the tags, the complete panel does not need to be imaged to identify the corners of the fiducials in the captured images allowing for robustness to detection errors, illumination changes (particularly when the calibration is performed in an outdoors environment), low false positive detection rates, or the like. From the tag information and captured images boards, the fiducial corners are calculated and located. The identified corners are used to estimate camera parameters, where the camera parameters contain the intrinsic matrix and distortion parameters using any now or hereafter known methods. Such camera parameters may be compared to a camera model determined during a previously performed camera calibration reference (e.g., calibration performed at a service center facility) and retrieved from a data store. For example, the focal length, extrinsic translation, extrinsic rotation, or other camera parameters (intrinsic and/or extrinsic) determined from the calibration images may be compared to those included in the camera model. A variation in one or more of the camera parameters that is greater than a corresponding threshold may be indicative that the camera calibration is no longer valid or cannot be verified. For example, a change in focal length that is greater than about 1%, about 0.9%, about 1.1%, about 0.8-1.2%, or the like, may be indicative that the camera calibration is no longer valid. Optionally, the 3-sigma uncertainty in focal length greater than about 0.25% of the estimated values may be indicative that the camera calibration is no longer valid. Similarly, a change in the extrinsic translation that is greater than about 2 cm, about 1.9 cm, about 2.1 cm, about 1.8-1.2 cm, or the like, may be indicative that the camera calibration is no longer valid. In another example, a change in extrinsic rotation that is greater than about 0.1 degrees, about 0.09 degrees, about 0.11 degrees, about 0.08-0.12 degrees, or the like, may be indicative that the camera calibration is no longer valid. Optionally, the 3-sigma uncertainty in extrinsic estimates (e.g., translation and/or rotation) greater than about 0.5% to about 1.5%, about 0.6% to about 1.4%, about 0.7% to about 1.3%, 0.8% to about 1.2%, 0.9% to about 1.1%, or the like of the estimated values may be indicative that the camera calibration is no longer valid because a higher standard deviation is typically indicative that the calibration is unreliable.

Additionally and/or alternatively, for camera-based calibration factor, the identified pixel coordinates of the corners may be re-projected back and correlated with calibration target images to determine a reprojection error as the distance between the pixel coordinates of a corner detected in a calibration image and a corresponding world point projected into the same image. A value of reprojection error larger than 1 pixel may be indicative a sensor calibration issue. Optionally, pixel, value of reprojection error larger than about 0.5 pixel, about 0.7 pixel, about 1.1 pixel, about 1.3 pixel, about 0.5-1.1 pixel, about 0.6-1.2 pixel, or the like may be indicative a sensor calibration issue. Optionally, outlier errors may be eliminated based on statistical analyses.

In addition to the camera-based calibration validation, the system may also perform motion-based validation to account for motion of various sensors. In a properly calibrated system, movement of a vehicle equipped with camera and objects in the field of view of the camera as determined via image processing of captured image data should coincide with and be the same as movement of the vehicle determined and predicted via the vehicle data based kinematic model. In other words, the kinematic model can be used to determine how an object present in the field of view of the camera may move relative to the vehicle as the vehicle is driven (e.g., relative velocity), and when the camera is properly calibrated, the location and movement of the object as determined via image processing of subsequent frames of captured image data should coincide with the predicted location and movement of the object as determined via use of the kinematic model. However, if a particular camera capturing image data processed in the first and second frames of captured image data is no longer properly calibrated, the motion of the object predicted by use of the vehicle kinematic vector determined by the vehicle data based kinematic model will be different than the relative motion of the object in the field of view of the misaligned camera as captured over two or more frames of image data. Thus, the control can determine and utilize this determined difference to establish or determine that an out of calibration condition of the subject vehicle camera exists if, for example, the difference is greater than a threshold. The motion-based validation may be performed for validation of calibration.

In various embodiments, the camera-based calibration test must always be satisfied based on the statistical ranges discussed above for a calibration to be validated. However, in certain situations, the calibration may be validated even when the motion-based validation tests fail such as, for example, when errors are introduced during map-based validation due to environmental effects, map validity, calibration validity of other vehicle sensors, etc. Optionally, if the camera-based calibration is satisfied and the motion-based validation is not satisfied, the system may repeat the motion-based validation for a certain number of times, and validate the calibration if the motion-based validation is successful for at least a threshold number of times (e.g., more than 50%, more than, 60%, more than 75%, more than 90%, or the like). For example, the system may use the camera calibration validation factor and the motion-based validation factor to generate a confidence score, which is an assessment of confidence in the accuracy of the calibration of the camera that captured the image frames of the calibration target. The confidence score thus indicates a likelihood that the sensor (e.g., camera) is correctly calibrated. According to various embodiments, a weighted sum is used to combine the two. For example, according to an embodiment, the confidence score may be calculated as confidence score=aX+bY, where a and b are pre-defined constants, X is the camera calibration validation metric, and Y is the motion-based validation metric. It is noted, however, that other algorithms for generating the confidence score may be used, according to various embodiments, while maintaining the spirit and functionality of the present disclosure.

Optionally, the system may determine whether the confidence score is above or below a threshold. According to various embodiments, the threshold may be a predetermined value that is stored in a memory such as a database. Alternatively, or in addition, the threshold may be updated and/or may be dynamic in nature. If the confidence score is above the threshold, then the system may consider the sensor (e.g., camera) to be calibrated. If the confidence score is below the threshold, then the system may consider the sensor (e.g., camera) be not calibrated.

If the cameras are calibrated (306: YES), steps 302-306 may be repeated, for example, periodically, upon occurrence of certain events (e.g., a detection of a jolt, rain, etc.), and/or upon receipt of user instructions. If one or more cameras are not calibrated (306: NO), the system may generate a signal that will result in an action (308). The signal may be a communication to a user interface in the AV and/or an external server with a message indicating that that the camera is not calibrated. The system also may generate an alternative message when the system determines that the camera is calibrated. In addition, the system may identify an action for the AV to perform and causes the AV to perform the action (310). The action may include recalibrating the sensor, altering a trajectory of the AV, altering a velocity of the AV, and/or any other suitable action in response to the action assessment. Optionally, the action may be performed only if an action assessment score is above a threshold, the action assessment score correlated to a perceived likelihood that an event is to occur. According to various embodiments, the threshold for the action assessment score may be a predetermined that is stored in a memory such as a database. Alternatively, or in addition, the threshold may be updated and/or may be dynamic in nature.

In various embodiments, the system may use the calibration target to recalibrate the camera(s). For example, by observing the calibration target at a predefined position, distance, and orientation using a sensor, the system can calibrate vehicle sensors using any now or hereafter known calibration methods. For example, calibrating a camera may include determining correlations between the determined locations and identifications of the one or more fiducials in the calibration images, and locations and identifications of the one or more fiducials on the calibration target. Based on these determined correlations, parameters of a camera matrix may be estimated using a pinhole camera model. Using the pinhole camera model may include determining a three-dimensional location of a pinhole representing an aperture of the camera using the determined correlations. Additionally or alternatively, calibrating the camera may include accounting for radial distortions or tangential distortions.

Optionally, users can be instructed to recalibrate the camera(s) using a notification or alert (for example, using a vehicle interface such as an interactive display or audio system). The notifications or alerts can be issued periodically or at certain triggers, for example, based on a defined amount of time that has passed or a defined number of miles driven since the last calibration.

Optionally, the system may adjust the camera calibration accordingly to bring the camera into calibration so as to have the location and relative movement of detected objects coincide with the predicted location and movement based on the actual kinematic/orientation of the equipped vehicle.

In some embodiments, the calibration module calculates a vehicle pose calibration metric that can be used to validate camera calibration is accurate as described in U.S. patent application Ser. No. 17/409,472, the disclosure of which is incorporated herein by reference in its entirety.

It should be noted that while this disclosure describes validation of camera calibration and/or re-calibration, it is not so limiting, and the principles disclosed in this document may similarly be used for other sensors.

Figure 5:
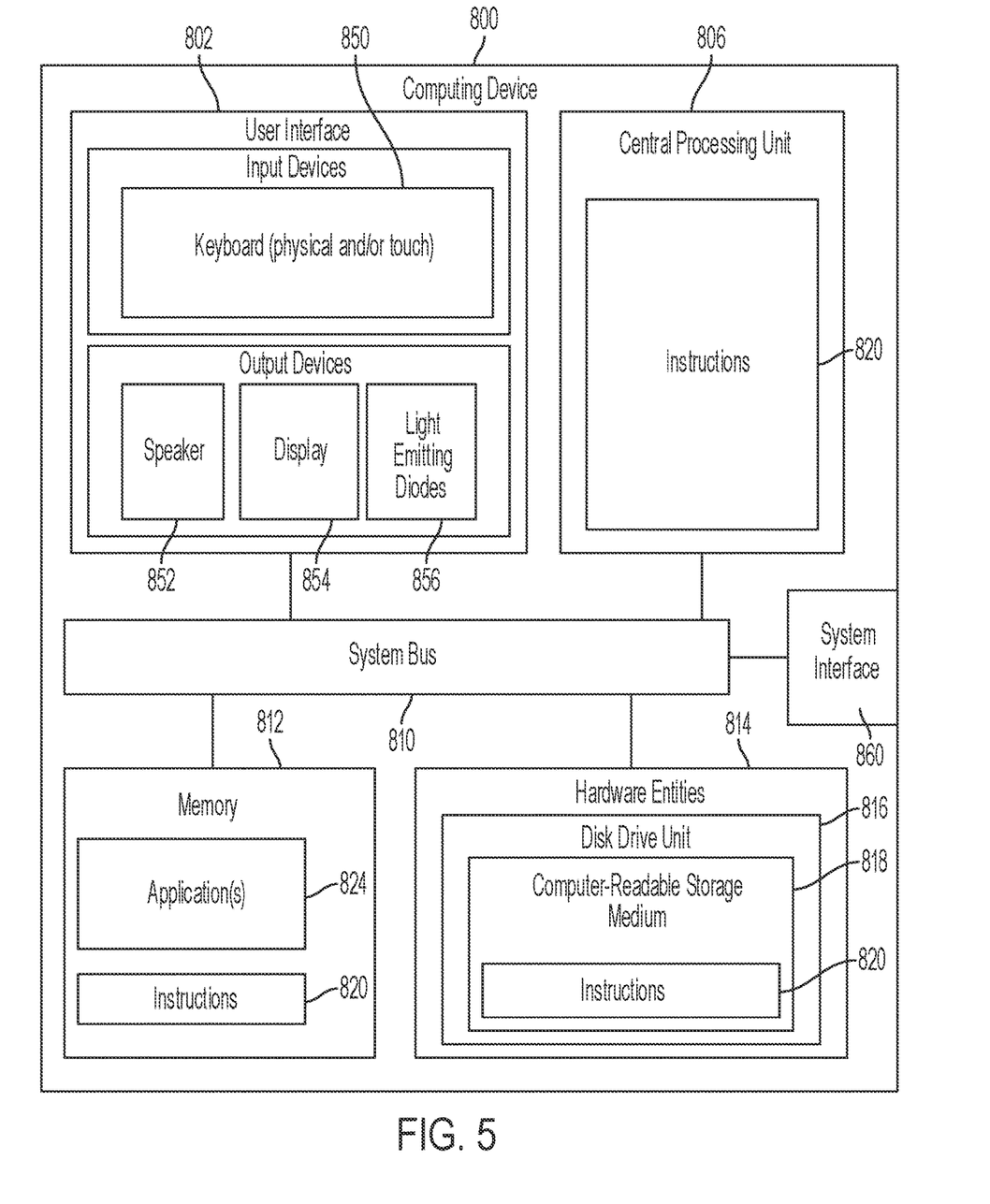
FIG. 5 is an illustration of various elements of an illustrative computing device, in accordance with the present disclosure.

Referring now to FIG. 5, an illustration of an illustrative architecture for a computing device 500 is provided. The computing device 120 of FIG. 1 is the same as or similar to computing device 500. As such, the discussion of computing device 500 is sufficient for understanding the computing device 120 of FIG. 1.

Computing device 500 may include more or less components than those shown in FIG. 1. However, the components shown are sufficient to disclose an illustrative solution implementing the present solution. The hardware architecture of FIG. 5 represents one implementation of a representative computing device configured to one or more methods and means for determining object trajectories, as described herein. As such, the computing device 500 of FIG. 5 implements at least a portion of the method(s) described herein.

Some or all components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, a system interface 560, and hardware entities 514 connected to system bus 510. The user interface can include input devices and output devices, which facilitate user-software interactions for controlling operations of the computing device 500. The input devices include, but are not limited to, a physical and/or touch keyboard 550. The input devices can be connected to the computing device 500 via a wired or wireless connection (e.g., a Bluetooth® connection). The output devices include, but are not limited to, a speaker 552, a display 554, and/or light emitting diodes 556. System interface 560 is configured to facilitate wired or wireless communications to and from external devices (e.g., network nodes such as access points, etc.).

At least some of the hardware entities 514 perform actions involving access to and use of memory 512, which can be a random-access memory ("RAM"), a disk drive, flash memory, a compact disc read only memory ("CD-ROM") and/or another hardware device that is capable of storing instructions and data. Hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding, or carrying a set of instructions 520 for execution by the computing device 500 and that cause the computing device 500 to perform any one or more of the methodologies of the present disclosure.

Figure 6:
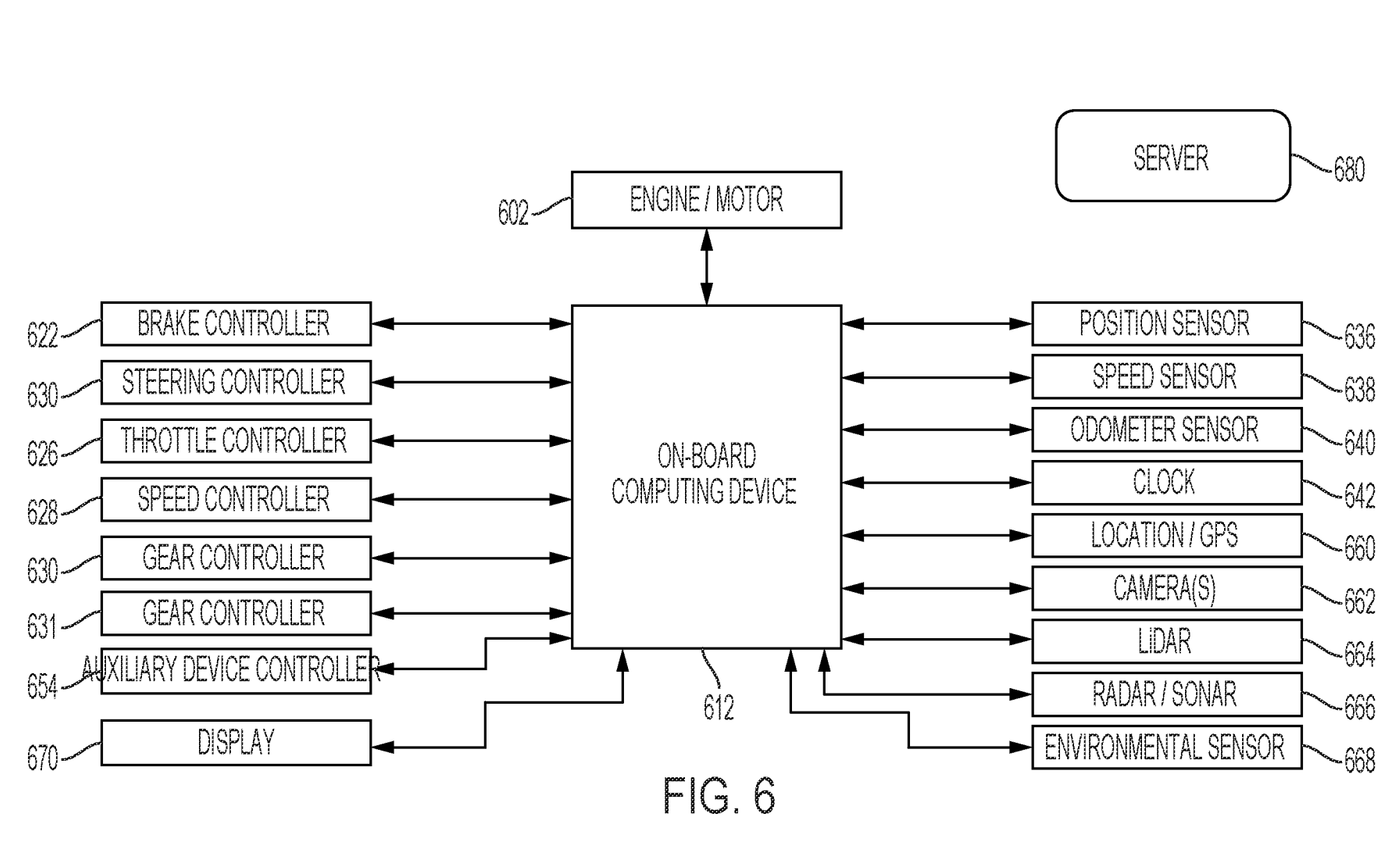
FIG. 6 illustrates example elements of an autonomous vehicle, in accordance with various embodiments of the present disclosure.

FIG. 6 illustrates an example system architecture for a vehicle 601, such as the AV 105 of FIG. 1. The vehicle 601 may include an engine or motor 602 and various sensors for measuring various parameters of the vehicle and/or its environment. Operational parameter sensors that are common to both types of vehicles include, for example: a position sensor 636 such as an accelerometer, gyroscope and/or inertial measurement unit; a speed sensor 638; and an odometer sensor 640. The vehicle 601 also may have a clock 642 that the system architecture uses to determine vehicle time during operation. The clock 642 may be encoded into the vehicle on-board computing device 612. It may be a separate device, or multiple clocks may be available. The computing device 120 of FIG. 1 and/or computing device 500 of FIG. 5 is the same as or similar to computing device 612.

The vehicle 601 also may include various sensors that operate to gather information about the environment in which the vehicle is traveling. These sensors may include, for example: a location sensor 660 such as a GPS device; object detection sensors such as one or more cameras 662; a LiDAR sensor system 664; and/or a radar and or and/or a sonar system 666. The sensors also may include environmental sensors 668 such as a precipitation sensor and/or ambient temperature sensor. The object detection sensors may enable the vehicle 601 to detect objects that are within a given distance or range of the vehicle 601 in any direction, while the environmental sensors collect data about environmental conditions within the vehicle's area of travel. The system architecture will also include one or more cameras 662 for capturing images of the environment. Any or all of these sensors will capture sensor data that will enable one or more processors of the vehicle's on-board computing device 612 and/or external devices to execute programming instructions that enable the computing system to classify objects in the perception data, and all such sensors, processors and instructions may be considered to be the vehicle's perception system. The vehicle also may receive information from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle that may encounter or affect in its environment.

During operations, information is communicated from the sensors to an on-board computing device 612. The on-board computing device 612 analyzes the data captured by the sensors and optionally controls operations of the vehicle based on results of the analysis. For example, the on-board computing device 612 may control braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers such as an auxiliary device controller 654.

Geographic location information may be communicated from the location sensor 660 to the on-board computing device 612, which may then access a map of the environment that corresponds to the location information to determine known fixed features of the environment such as streets, buildings, traffic lights, stop signs and/or stop/go signals. Captured images from the cameras 662 and/or object detection information captured from sensors such as a LiDAR system 664 is communicated from those sensors to the on-board computing device 612. The object detection information and/or captured images may be processed by the on-board computing device 612 to detect objects in proximity to the vehicle 601. In addition, or alternatively, the vehicle 601 may transmit any of the data to a remote server system 680 for processing. Any known or to be known technique for making an object detection based on sensor data and/or captured images can be used in the embodiments disclosed in this document.

In addition, the autonomous vehicle may include an onboard display device 670 that may generate and output interface on which sensor data, vehicle status information, or outputs generated by the processes described in this document (e.g., various maps and routing information) are displayed to an occupant of the vehicle. The display device may include, or a separate device may be, an audio speaker that presents such information in audio format. According to various embodiments, calibration results may be output on an in-dash display.

The on-board computing device 612 may obtain, retrieve, and/or create map data that provides detailed information about the surrounding environment of the autonomous vehicle 601. The on-board computing device 612 may also determine the location, orientation, pose, etc. of the AV in the environment (localization) based on, for example, three-dimensional position data (e.g., data from a GPS), three-dimensional orientation data, predicted locations, or the like. For example, the on-board computing device 612 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 612 in analyzing the surrounding environment of the autonomous vehicle 601.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on historical observations of vehicles or other objects over a period of time (e.g., reference paths for straight line travel, lane merge, a turn, or the like).

In certain embodiments, the on-board computing device 612 may also include and/or may receive information relating to the trip or route of a user, real-time traffic information on the route, or the like.

The on-board computing device 612 may include and/or may be in communication with a routing controller 631 that generates a navigation route from a start position to a destination position for an autonomous vehicle. The routing controller 831 may access a map data store to identify possible routes and road segments that a vehicle can travel on to get from the start position to the destination position. The routing controller 631 may score the possible routes and identify a preferred route to reach the destination. For example, the routing controller 631 may generate a navigation route that minimizes Euclidean distance traveled or other cost function during the route and may further access the traffic information and/or estimates that can affect an amount of time it will take to travel on a particular route. Depending on implementation, the routing controller 631 may generate one or more routes using various routing methods, such as Dijkstra's algorithm, Bellman-Ford algorithm, or other algorithms. The routing controller 631 may also use the traffic information to generate a navigation route that reflects expected conditions of the route (e.g., current day of the week or current time of day, etc.), such that a route generated for travel during rush-hour may differ from a route generated for travel late at night. The routing controller 631 may also generate more than one navigation route to a destination and send more than one of these navigation routes to a user for selection by the user from among various possible routes.

In various embodiments, an on-board computing device 612 may determine perception information of the surrounding environment of the autonomous vehicle 601. Based on the sensor data provided by one or more sensors and location information that is obtained, the on-board computing device 612 may determine perception information of the surrounding environment of the autonomous vehicle 601. The perception information may represent what an ordinary driver would perceive in the surrounding environment of a vehicle. The perception data may include information relating to one or more objects in the environment of the autonomous vehicle 601. For example, the on-board computing device 612 may process sensor data (e.g., LiDAR or RADAR data, camera images, etc.) to identify objects and/or features in the environment of autonomous vehicle 601. The objects may include traffic signals, roadway boundaries, other vehicles, pedestrians, and/or obstacles, etc. The on-board computing device 612 may use any now or hereafter known object recognition algorithms, video tracking algorithms, and computer vision algorithms (e.g., track objects frame-to-frame iteratively over a number of time periods) to determine the perception.

In some embodiments, the on-board computing device 612 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 612 may perform one or more prediction and/or forecasting operations. For example, the on-board computing device 612 may predict future locations, trajectories, and/or actions of one or more objects. For example, the on-board computing device 612 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 601, the surrounding environment, and/or their relationship(s). For example, if an object is a vehicle and the current driving environment includes an intersection, the on-board computing device 612 may predict whether the object will likely move straight forward or execute a turn. If the perception data indicates that the intersection has no traffic light, the on-board computing device 612 may also predict whether the vehicle may have to fully stop prior to enter the intersection.

In various embodiments, the on-board computing device 612 may determine a motion plan for the autonomous vehicle. For example, the on-board computing device 612 may determine a motion plan for the autonomous vehicle based on the perception data and/or the prediction data. Specifically, given predictions about the future locations of proximate objects and other perception data, the on-board computing device 612 can determine a motion plan for the autonomous vehicle 601 that best navigates the autonomous vehicle relative to the objects at their future locations.

In one or more embodiments, the on-board computing device 612 may receive predictions and make a decision regarding how to handle objects and/or actors in the environment of the autonomous vehicle 601. For example, for a particular actor (e.g., a vehicle with a given speed, direction, turning angle, etc.), the on-board computing device 612 decides whether to overtake, yield, stop, and/or pass based on, for example, traffic conditions, map data, state of the autonomous vehicle, etc. Furthermore, the on-board computing device 612 also plans a path for the autonomous vehicle 601 to travel on a given route, as well as driving parameters (e.g., distance, speed, and/or turning angle). That is, for a given object, the on-board computing device 612 decides what to do with the object and determines how to do it. For example, for a given object, the on-board computing device 612 may decide to pass the object and may determine whether to pass on the left side or right side of the object (including motion parameters such as speed). The on-board computing device 612 may also assess the possibility of a collision between a detected object and the autonomous vehicle 601. If the possibility exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 612 may execute one or more control instructions to perform a cautious maneuver (e.g., mildly slow down, accelerate, change lane, or swerve). In contrast, if the collision cannot be avoided, then the on-board computing device 612 may execute one or more control instructions for execution of an emergency maneuver (e.g., brake and/or change direction of travel).

As discussed above, planning and control data regarding the movement of the autonomous vehicle is generated for execution. The on-board computing device 612 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above-described embodiments. Rather, the scope of the present solution should be defined in accordance with the following claims and their equivalents.

What is claimed is:

1. A method of determining whether a camera of an autonomous vehicle (AV) is calibrated, comprising:
    determining, for a calibration target, a relative positional range with respect to the AV, the relative positional range comprising a plurality of locations and a plurality of orientations of the calibration target relative to the AV;
    dynamically configuring a calibration pattern of the calibration target based on a characteristic of the camera through a selective activation or deactivation of at least one uniquely identifiable tag disposed on the calibration target;
    capturing, using the camera, a plurality of images of the calibration target when the calibration target and the AV are positioned within the relative positional range, wherein the calibration target has fiducials disposed thereon for providing optically recognizable features defining the calibration pattern and wherein the at least one uniquely identifiable tag is positioned at a corner of one or more said fiducials;
    analyzing each of the plurality of images to retrieve tag data from the at least one uniquely identifiable tag;
    locating corners of the fiducials using the retrieved tag data;
    measuring, based on the plurality of images and the located corners, a camera-based calibration factor and a motion-based validation factor;
    using the camera-based calibration factor and the motion-based validation factor to generate a confidence score; and
    in response to the confidence score being below a threshold, generating a signal indicating that the camera is not calibrated.

2. The method of claim 1, wherein determining the plurality of locations in the relative positional range comprises determining the plurality of locations such that the calibration target remains within a field of view of at least two cameras of the vehicle.

3. The method of claim 1, wherein determining the plurality of locations in the relative positional range comprises determining the plurality of locations such that the calibration target remains within about 80% to about 120% of a focal length of the camera.

4. The method of claim 1, wherein determining the plurality of orientations in the relative positional range comprises determining the plurality of orientations based on a resolution of the camera and a size of one or more fiducials included in the calibration target.

5. The method of claim 1, further comprising, in response to the confidence score being below the threshold, performing an action assessment of the AV.

6. The method of claim 5, further comprising, based on the action assessment, causing the AV to perform an action.

7. The method of claim 6, wherein the action includes one or more of the following:
    recalibrating the camera;
    altering a trajectory of the AV; or
    altering a velocity of the AV.

8. The method of claim 1, wherein measuring the camera-based calibration factor comprises measuring the camera-based calibration factor based on at least one of the following:
    a re-projection error;

a change in one or more intrinsic parameters of the camera with respect to a previously performed calibration;

a change in one or more intrinsic parameters of the camera with respect to the previously performed calibration;

an optimization uncertainty check of the one or more intrinsic parameters of the camera with respect to corresponding estimated values; or an optimization uncertainty check of the one or more extrinsic parameters of the camera with respect to corresponding estimated values.

9. The method of claim 1, wherein measuring the motion-based validation factor comprises:

estimating, based on the plurality of images, a first velocity of the camera;

estimating, using one or more inertial sensors of the AV, a second velocity of the camera; and comparing the first velocity and the second velocity.

10. The method of claim 1, further comprising configuring the fiducials included in the calibration target based on one or more intrinsic parameters of the camera.

11. A system of determining whether a camera of an autonomous vehicle (AV) is calibrated, the system comprising:

a processor; and a non-transitory computer-readable medium comprising programming instructions that when executed by the processor will cause the processor to:

determine, for a calibration target, a relative positional range with respect to the AV, the relative positional range comprising a plurality of locations and a plurality of orientations of the calibration target relative to the AV;

dynamically configure a calibration pattern of the calibration target based on a characteristic of the camera through a selective activation or deactivation of at least one uniquely identifiable tag disposed on the calibration target;

capture, using the camera, a plurality of images of the calibration target when the calibration target and the AV are positioned within the relative positional range, wherein the calibration target has fiducials disposed thereon for providing optically recognizable features defining the calibration pattern and wherein the at least one uniquely identifiable tag positioned at a corner of one or more said fiducials;

analyze each of the plurality of images to retrieve tag data from the at least one uniquely identifiable tag;

locate corners of the fiducials using the retrieved tag data;

measure, based on the plurality of images and the located corners, a camera-based calibration factor and a motion-based validation factor;

use the camera-based calibration factor and the motion-based validation factor to generate a confidence score; and in response to the confidence score being below a threshold, generate a signal indicating that the camera is not calibrated.

12. The system of claim 11, wherein the programming instructions that when executed by the processor will cause the processor to determine the plurality of locations in the relative positional range comprise programming instructions to cause the processor to determine the plurality of locations such that the calibration target remains within a field of view of at least two cameras of the vehicle.

13. The system of claim 11, wherein the programming instructions that when executed by the processor will cause the processor to determine the plurality of locations in the relative positional range comprise programming instructions to cause the processor to determine the plurality of locations such that the calibration target remains within about 80% to about 120% of a focal length of the camera.

14. The system of claim 11, wherein the programming instructions that when executed by the processor will cause the processor to determine the plurality of orientations in the relative positional range programming instructions to cause the processor to determine the plurality of orientations based on a resolution of the camera and a size of one or more fiducials included in the calibration target.

15. The system of claim 11, further comprising programming instructions that when executed by the processor will cause the processor to, in response to the confidence score being below the threshold, perform an action assessment of the AV.

16. The system of claim 15, further comprising programming instructions that when executed by the processor will cause the processor to, based on the action assessment, cause the AV to perform an action.

17. The system of claim 16, wherein the action includes one or more of the following:

recalibrating the camera;

altering a trajectory of the AV; or altering a velocity of the AV.

18. The system of claim 11, wherein the programming instructions that when executed by the processor will cause the processor to measure the camera-based calibration factor programming instructions to cause the processor to measure the camera-based calibration factor based on at least one of the following:

a re-projection error;

a change in one or more intrinsic parameters of the camera with respect to a previously performed calibration;

a change in one or more intrinsic parameters of the camera with respect to the previously performed calibration;

an optimization uncertainty check of the one or more intrinsic parameters of the camera with respect to corresponding estimated values; or an optimization uncertainty check of the one or more extrinsic parameters of the camera with respect to corresponding estimated values.

19. The system of claim 11, wherein the programming instructions that when executed by the processor will cause the processor to measure the motion-based validation factor comprise programming instructions to cause the processor to:

estimate, based on the plurality of images, a first velocity of the camera;

estimate, using one or more inertial sensors of the AV, a second velocity of the camera; and compare the first velocity and the second velocity.

20. A computer programmable product comprising a processor, a memory and programming instructions that are configured to cause the processor to:

determine, for a calibration target, a relative positional range with respect to an autonomous vehicle (AV), the relative positional range comprising a plurality of locations and a plurality of orientations of the calibration target relative to the AV;

dynamically configure a calibration pattern of the calibration target based on a characteristic of the camera through a selective activation or deactivation of at least one uniquely identifiable tag disposed on the calibration target;

capture, using a camera, a plurality of images of the calibration target when the calibration target and the AV are positioned within the relative positional range, wherein the calibration target has fiducials disposed thereon for providing optically recognizable features defining the calibration pattern and wherein the at least one uniquely identifiable tag positioned at a corner of one or more said fiducials;

analyze each of the plurality of images to retrieve tag data from the at least one uniquely identifiable tag;

locate corners of the fiducials using the retrieved tag data;

measure, based on the plurality of images and the located corners, a camera-based calibration factor and a motion-based validation factor;

use the camera-based calibration factor and the motion-based validation factor to generate a confidence score; and in response to the confidence score being below a threshold, generate a signal indicating that the camera is not calibrated.

* * * * *